June 29, 1965 K. DLUHOSCH 3,191,451

MULTIPLE SPEED GEAR TRANSMISSION WITH REVERSE SPEED

Filed Dec. 1, 1961 3 Sheets-Sheet 1

INVENTOR

Kurt Dluhosch

By Richard Ernst
Agt

June 29, 1965   K. DLUHOSCH   3,191,451
MULTIPLE SPEED GEAR TRANSMISSION WITH REVERSE SPEED
Filed Dec. 1, 1961   3 Sheets-Sheet 2

INVENTOR
Kurt Dluhosch
By Richard End
Agt

June 29, 1965  K. DLUHOSCH  3,191,451
MULTIPLE SPEED GEAR TRANSMISSION WITH REVERSE SPEED
Filed Dec. 1, 1961  3 Sheets-Sheet 3

INVENTOR.
Kurt Dluhosch
BY 3,191,451
MULTIPLE SPEED GEAR TRANSMISSION
WITH REVERSE SPEED
Kurt Dluhosch, Schweinfurt (Main), Germany, assignor to Fichtel & Sachs A.G., Schweinfurt (Main), Germany, a corporation of Germany
Filed Dec. 1, 1961, Ser. No. 156,291
Claims priority, application Germany, Dec. 2, 1960, F 32,682
10 Claims. (Cl. 74—337.5)

This invention relates to multiple speed gear transmissions of the automotive type having a plurality of forward speed positions and a reverse speed position, and more particularly to a sliding-gear transmission of the progressive type equipped with special control means for shifting the transmission to the neutral speed position.

Progressive multiple speed transmissions have been previously equipped with reverse speed arrangements. These known devices have shortcomings which limit their utility in most motorcycles and in applications in which requirements of a similar nature have to be met.

An object of this invention is the provision of a multiple speed gear transmission with reverse speed which is suitable for use in motorcycles and in similar applications.

Another object is the provision of such a transmission which is relatively light in weight and of low bulk.

An additional object is the provision of a transmission which may be reversed without disconnecting or arresting the source of motive power.

A further object is the provision of a transmission which an operator may safely and conveniently control by means of operating elements which are outside the field of vision of the operator, do not require visual inspection of their position for proper operation, nor experience on the operator's part to compensate for visually unfavorable location of the operating elements.

Yet another object is the provision of a transmission which may be shifted between several forward speeds, a neutral position, and a reverse position with not more than two operating levers or other operating elements, yet is returned to neutral speed position from any forward speed prior to shifting into reverse speed.

An important object of the invention is the provision of a transmission of the type described which will shift automatically from any forward speed first into neutral position when it is being shifted into reverse speed.

With these and other objects in view, the transmission of the invention mainly consists of a plurality of gears which are movable relative to each other between a neutral speed position, several forward speed positions, and a reverse speed position, and an actuating mechanism for shifting the gears between these positions. The mechanism includes a neutral speed control capable of moving sequentially from an inoperative position to a first, and then to a second operative position. The neutral speed control is connected to the transmission gears and shifts them from a forward speed position to the neutral speed position when the control moves from the inoperative to the first operative position. The mechanism further includes a reverse speed control which also is movable between an inoperative and an operative position, and by its movement shifts the gears into the reverse speed position. The two speed controls are connected by motion transmitting means in such a manner that movement of the reverse speed actuating means from the inoperative to the operative position is actuated when the neutral speed control moves from its first to its second operative position.

Other features and many of the attendant advantages of this invention will be readily appreciated as the same becomes better understood by reference to the following detailed description of a preferred embodiment when considered in connection with the accompanying drawings in which like reference numerals designate like parts throughout the figures thereof, and wherein.

Figure 1:
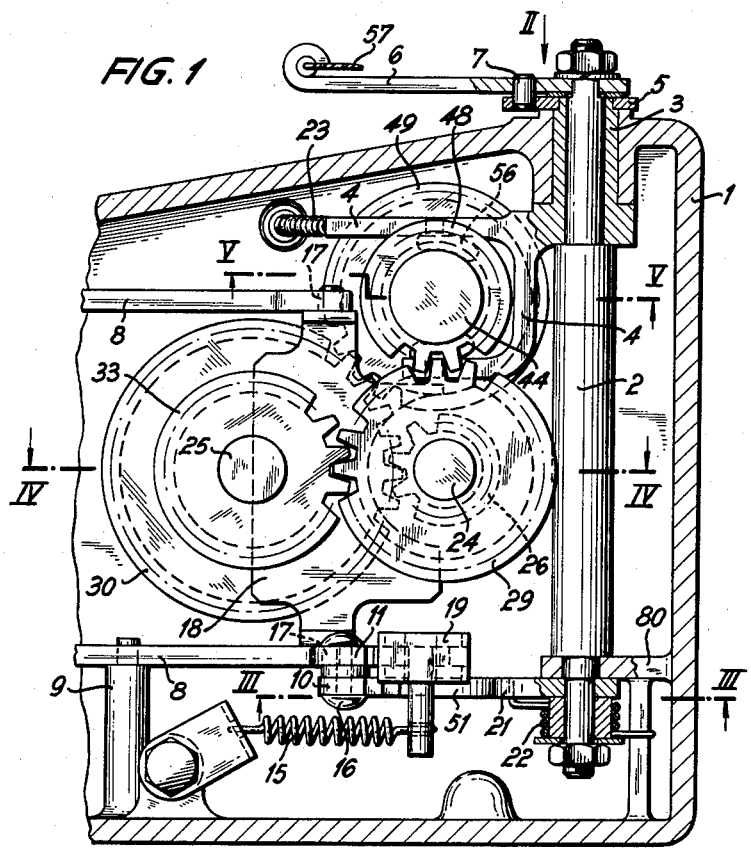
FIG. 1 shows a transmission of the invention in fragmentary front elevational section.

Referring now to the drawing in detail, there is shown a transmission case 1 in which three parallel shafts 24, 25, and 44 are journaled. The shaft 24 is the input shaft of the transmission and is supported in the case 1 by means of a ball bearing 60 and a roller bearing 62. The shaft 25 is the output shaft of the transmission and is supported in two antifriction bearings 64, 66. The shaft 44 is the reverse speed countershaft of the transmission and is supported in sleeve bearings 68 and 70.

Three gears 26, 27, and 28 are secured on the input shaft 24 against rotation relative thereto and against axial movement. They differ in pitch diameter. The smallest gear 26 is integrally machined from the shaft 24. The gears 27 and 28 are separate elements fixedly fastened to the shaft. A fourth gear 29 is rotatable on the shaft 24 in axially fixed position. A bearing sleeve 72 is interposed between the shaft 24 and the gear 29.

The output shaft 25 carries three axially fixed but rotatable gears 30, 31, 32 and a gear 33 which is fixedly fastened to the output shaft. The gears 30, 31, and 32 have internal clutch teeth 34, 35, 36 respectively. The internal clutch teeth are radially aligned with respective annular grooves 74, 76, 78 in the shaft 25 so as not normally to interfere with the free rotation of the gears on the output shaft 25.

Figure 4:
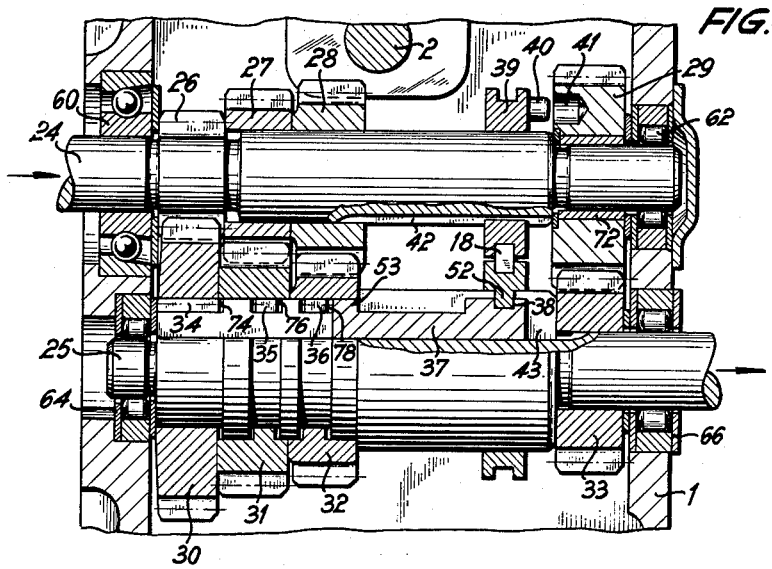
FIG. 4 illustrates the transmission of FIG. 1 in plan section on the line IV—IV.

The shaft 25 has a plurality of axial grooves 43 of which only one is seen in FIG. 4. Slidable clutch members 37 are respectively arranged in the grooves 43. Simultaneous axial sliding movement of the clutch members 37 is actuated by a shifter disk 52 which is axially movable on the output shaft 25 and engages a radial recess 38 in each clutch member 37.

The clutch members 37 are secured in the grooves 43 against rotation relative to the shaft 25 and have radial projections 53 which are engageable with the internal clutch teeth 34, 35, 36 of the gears 30, 31, 32, whereby the gears may be selectively connected to the shaft for joint rotation. When shifting between the gears 30, 31, 32, the clutch members 37 pass through intermediate positions in which they are out of engagement with any one of the gears.

The gears 30, 31, 32, and 33 constantly mesh with the respective gears 26, 27, 28, and 29 of the input shaft 24. When the gear 30 is held against rotation on the output shaft 25, the transmission is in first forward speed position. During power transmitting engagement between the gears 27 and 31, the transmission is in second, and during engagement of gears 28 and 32 in third forward speed position. FIG. 4 shows the transmission in a neutral speed position. Movement of the shifter disk 52 toward the left from the position illustrated would sequentially shift the transmission into third, neutral, second, neutral, and first speed.

A shifter disk 39 is axially slidable on the input shaft 24, but is secured against rotation by engagement with an axially elongated groove 42 on the shaft 24. The disk 39 is equipped with eccentric, axially projecting pins 40 of which one only is visible in FIG. 4. The pins engage corresponding recesses 41 of the gear 29, whereby the gear 29 is fixedly fastened to the shaft 24 and caused to rotate with it. The fourth speed position of the transmission is reached when the shifter disk 39 moves toward the right from the position illustrated in FIG. 4.

Shifting between the several forward speeds is accomplished by means of a gear shifting segment 18, best seen in FIG. 1, which engages radial recesses in the shifter disks 39 and 52 as seen in FIG. 4. The segment 18 is mounted by means of pins 17 between the two arms of a shifter fork 8. The fork is pivoted on the case 1 by means of a pin 9. The shifter fork 8 is operator controlled by a conventional actuating element not further illustrated, such as a speed shifting pedal of a motorcycle or a shift lever.

Figure 5:
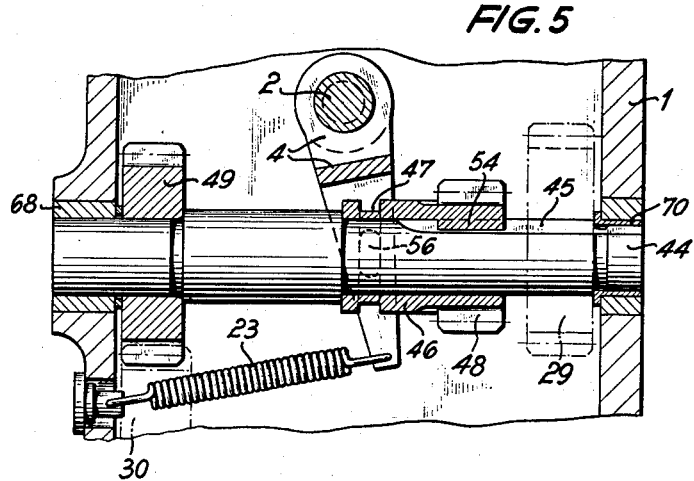
FIG. 5 is a sectional view similar to FIG. 4, but taken on the line V—V.

A gear 49 is seen in FIG. 5. It constantly meshes with the gear 30 which is normally freely rotatable on the output shaft 25. The gear 49 is fixedly fastened to the reverse speed countershaft 44. The countershaft also carries a hub sleeve 46 equipped with an external gear rim 48. A spline 54 projects radially inward from the sleeve 46 into an axial groove 45 in the countershaft 44 and guides axial movement of the sleeve on the countershaft while preventing relative rotation. In the position seen in FIG. 5, the sleeve 46 rotates freely with the countershaft 44. It is axially alignable with the gear 29 which is normally rotatable on the input shaft 24. When the gear rim 48 is brought into meshing engagement with the gear 29 by movement of the sleeve 46 to the right from the position illustrated in FIG. 5, a power train is established which includes the input shaft 24, the gears 26, 30, and 49, the countershaft 44, the gear rim 48, the gears 29 and 33, and the output shaft 25 in this order. The transmission then is in its reverse speed position.

The axial movement of the sleeve 46 on the countershaft 44 is actuated by a shifter fork 4 which is also seen in FIG. 1. The fork has two pins 56 which engage an annular groove 47 of the sleeve 46. The fork 4 is fixedly fastened to or integral with a bearing sleeve 3 which is rotatably mounted in the transmission case 1. The fork 4 is urged by a helical spring 23 to move the sleeve 46 away from a position of meshing engagement with the gear 29.

Figure 3:
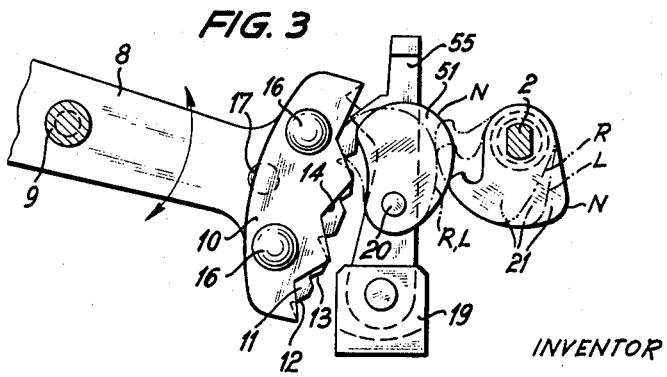
FIG. 3 is a sectional plan view of another detail of the apparatus of FIG. 1, the view being taken on the line III—III.

A second non-illustrated operator-controlled actuating element permits the transmission to be shifted into neutral speed position from any forward speed position. For this purpose, the transmission is equipped with a control shaft 2 seen in FIG. 1, but also in the detail views of FIGS. 2 and 3. The upper end of the shaft 2 is journaled in the bearing sleeve 3. The lower end of the shaft is rotatably supported in an inwardly projecting rib 80 of the case 1. A shifter cam 21 is fixedly mounted on the bottom end of the control shaft 2. The cam may sequentially move from the fully drawn position N to the positions L and R indicated by chain dotted lines when the control shaft 2 turns in the bearing sleeve 3.

A pawl 55 is hingedly mounted on the case 1 by means of a forked support 19. A shifter dog 51 is pivoted to the pawl 55 by means of a pivot pin 20. The shifter cam 21 is urged into camming engagement with the dog 51 by a helical spring 22 coaxial with the shaft 2 as seen in FIG. 1.

The lower arm of the shifter fork 8 carries a plate 10 which is fastened to the arm by rivets 16. The end face 11 of the lower fork arm is formed with alternating deep notches 12 and shallow notches 13 which are engageable with a projection on the pawl 55. The corresponding end face 14 of the plate 10 forms a ratchet having three deep notches which are sequentially engageable by the shifter dog 51 during rotary movement of the fork 8 on the pin 9. The pawl 55 and the dog 51 are respectively urged into engagement with the end face 11 and out of engagement with the ratchet face 14 by helical springs 15 and 22.

Figure 2:
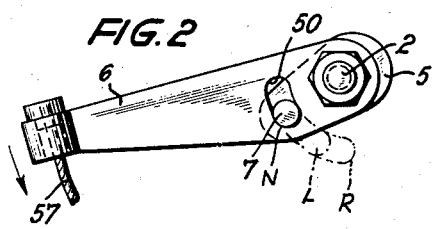
FIG. 2 shows a detail of the apparatus of FIG. 1 in plan view taken in the direction of the arrow II.

The top end of the shaft 2 carries a lever 6 which will hereinafter be referred to as the neutral shift lever. The lever 6 has an elongated slot 50 which is arcuate about the axis of the shaft 2. The slot is engaged by an abutment pin 7 which projects upward from a lever 5 fixedly fastened on the bearing sleeve 3. As shown in FIG. 2, the neutral shift lever 6 is in its inoperative position in which the pin 7 is spaced from one of the radial end walls of the slot 50 in the direction of the arrow. The free end of the lever 6 is fastened to a Bowden cable 57 which connects the lever 6 to the aforementioned non-illustrated operator-controlled second actuating element. The cooperation of the slot 50 with the pin 7 provides a lost motion arrangement which permits the lever 6 to be rotated through an angle equal to the angular spacing of reference characters N and L without simultaneous movement of the lever 5. During further movement of the neutral shift lever 6 from L to R the pin 7 engaged by the aforementioned radial wall of the slot 5, hereinafter referred to as the reverse shift lever, moves with the neutral shift lever.

The neutral speed and reverse speed controls actuated by rotary movement of the shaft 2 operates as follows:

When the neutral speed lever 6 moves from position N to position L (FIG. 2), the shifter cam 21 similarly moves from N to L (FIG. 3) and urges the shifter dog 51 against the ratchet face 14 of the plate 10 against the restraint of the spring 22. Engagement with the dog 51 causes rotary movement of the fork 8 about the pin 9 until the dog 51 abuts against the bottom of one of the ratchet notches. The segment 18 is aligned with the ratchet notches in such a manner that the clutch members 37 are in one of their three neutral speed positions, that is, the intermediate positions in which the projections 53 are out of axial alignment with the internal clutch teeth 34, 35, 36 of the gears 30, 31, 32, when the dog 51 is at the bottom of a ratchet notch.

The pin 7 is not affected by this first shifting movement of neutral speed lever 6. The length of the slot 50 is selected in such a manner that the radial end wall of the slot reaches a position of abutment against the pin 7 when the dog 51 is at the bottom of any one of the notches in the ratchet face 14. When the lever 6 is moved farther in the direction of the arrow (FIG. 2) by the Bowden cable 57, the reverse shift lever 5 moves with the neutral shift lever 6 through an angle corresponding to the spacing of reference characters L and R.

The resulting rotation of the shifter cam 21 does not change the position of the shifter dog 51, but it locks the dog in its position at the bottom of a notch in the ratchet face 14. The rotation of the reverse shift lever 5 is transmitted to the fork 4 by the bearing sleeve 3, and the hub sleeve 46 is axially shifted against the force of the spring 23. The dimensions of the motion transmitting elements are selected in such a manner that the gear rim 48 on the hub sleeve 46 is fully meshed with the gear 29 on the input shaft 24 when the neutral shift lever 6 reaches its position R. The interconnection between the neutral and reverse shift levers thus permits the reverse speed to be set by the neutral shift lever, and ensures a shift from any forward speed to reverse speed through an intermediate neutral speed position.

Figure 6:
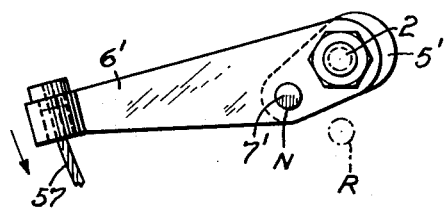
FIG. 6 shows a detail of a modified transmission of the invention in a view corresponding to that of FIG. 2.
Figure 7:
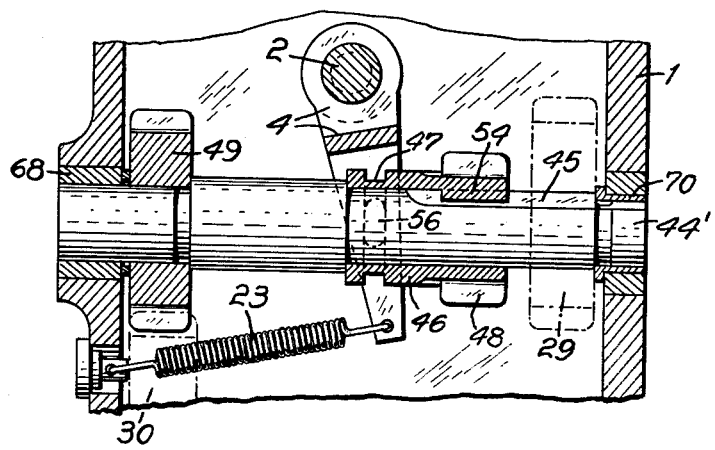
FIG. 7 shows another detail of the modified transmission in a view corresponding to that of FIG. 5.

In the modified embodiment of the invention illustrated in FIGS. 6 and 7, the dimensional relationship between the elements of the reverse speed control arrangement is changed to avoid the use of a lost motion device between the neutral speed control and the reverse speed control. The transmission is otherwise identical with that shown in FIGS. 1 to 5 except for the following features. The shaft 2 is fixedly connected with the fork 4 by a pin 7' conformingly received in the reverse shift lever 5' and the neutral lever 6'. The axial path of the hub sleeve 46 on the countershaft 44' is selected in such a manner that the gear rim 48 on the hub sleeve 46 remains out of engagement with the gear 29 until the neutral shift lever 6' moves from position N of the pin 7' to position R. The modified arrangement operates to ensure shifting the transmission into neutral speed position before the gears are engaged for reverse speed.

In both modifications of the apparatus, the pawl 55 provides a click stop which resiliently arrests movement of the shifter fork 8 either in a forward speed position when the pawl engages a deep notch 12 in the end face 11, or in an intermediate neutral position when the pawl engages one of the shallow notches 13. The engagement of the pawl 55 with the deep notches 12 is secured by the spring 15 the pressure of which can be overcome by the rotation of the shaft 2 so that the transmission may be shifted into neutral speed position from any forward speed position.

The transmission of the invention is of relatively simple construction. Its operation is entirely foolproof. It is impossible even for an inexperienced operator to move the transmission from any one of its forward speed positions into reverse speed position without first shifting into neutral speed. No error is possible. Yet, the transmission requires but two operator-controlled actuating elements respectively connected to the shifter fork 8 and the Bowden cable 57.

While a four-speed-and-reverse transmission has been chosen for illustrating this invention, the number of forward speeds is not critical and may be increased and decreased to suit specific operating requirements. Those skilled in the art also will be able to provide the transmission disclosed with more than one reverse speed without the exercise of inventive faculty if such a modification should be desired.

All controls of the transmission of the invention may be actuated by means of pedals or other actuating elements which need not be within the field of vision of the operator. The transmission is particularly suitable for use with motorcycles, but it is not limited to this application.

It should be understood therefore that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A transmission for an automotive vehicle and the like comprising, in combination:
   (a) an input shaft;
   (b) an output shaft rotatable in a forward direction and in a reverse direction;
   (c) a plurality of gears on each of said shafts,
      (1) each gear on said input shaft meshing with a gear on said output shaft and constituting therewith a pair of meshing gears,
      (2) one gear of each pair being secured on the respective one of said shafts against rotation relative thereto, and the other gear being normally rotatable on the other shaft,
      (3) the gears on said one shaft differing in pitch diameter from each other;
   (d) clutch means sequentially movable between a plurality of operating positions in which said clutch means simultaneously engages said other gears respectively and said other shaft for securing the engaged other gear to said other shaft against rotation relative thereto, and a plurality of inoperative positions, each inoperative position being interposed between two operative positions, said clutch means when in said inoperative positions being out of simultaneous engagement with said other shaft and with said other gears;
   (e) clutch actuating means for moving said clutch means between said positions thereof;
   (f) reverse gearing;
   (g) reverse speed control means for moving said reverse gearing toward and away from an engaged position in which said reverse gearing connects said output shaft to said input shaft for rotation of said output shaft by said input shaft in said reverse direction; and
   (h) motion transmitting means connecting said clutch actuating means to said reverse speed control means for moving said clutch means from each of said operative positions to an inoperative position when said reverse gearing is moved toward said position thereof by said reverse speed control means.

2. A transmission as set forth in claim 1, wherein said motion transmitting means includes lost motion means.

3. A transmission as set forth in claim 1, wherein said clutch actuating means include a neutral shifting member sequentially movable from a first to a second and a third position, and means connecting said shifting member to said clutch means for moving said clutch means from an operative position thereof to an inoperative position when said shifting member moves from said first to said second position thereof, and for holding said clutch means in said inoperative position when said shifting member moves from said second to said third position thereof, wherein said reverse speed control means include a reverse shifting member connected to said reverse gearing for movement therewith, and wherein said motion transmitting means include means for selectively moving said reverse shifting member when said neutral shifting member moves from said second to said third position thereof and for thereby moving said reverse gearing into said engaged position thereof.

4. A transmission as set forth in claim 1, wherein said gears are axially spaced on said input shaft and on said output shaft respectively, and said positions of said clutch means are axially spaced from each other, said inoperative positions being axially spaced from said operative positions.

5. A multiple speed transmission comprising, in combination:
   (a) an output shaft rotatable in a forward direction and a reverse direction;
   (b) an input shaft;
   (c) a plurality of axially juxtaposed gears on said output shaft and a plurality of axially juxtaposed gears on said input shaft,
      (1) the gears on said output shaft meshingly engaging respective gears on said input shaft and constituting therewith a plurality of pairs of meshed gears,
      (2) the gears on one of said shafts being secured to said one shaft against rotation relative thereto,
      (3) the gears on the other shaft being normally rotatable on said other shaft, and
      (4) the gears on said one shaft differing in pitch diameter from each other;
   (d) a clutch member axially movable relative to said other shaft between axially alternating operative positions and inoperative positions,
      (1) said clutch member in said operative positions thereof simultaneously engaging said other shaft and respective ones of said normally rotatable gears for selectively securing said gears to said shaft against relative rotation, and
      (2) said clutch member in said inoperative positions thereof being out of simultaneous engagement with said other shaft and with the gears normally rotatable thereon;
   (e) forward speed shifting means for moving said clutch member between said operative positions thereof, whereby said output shaft is rotated at different forward speeds while said input shaft rotates in a predetermined direction when said clutch member is in respective operative positions;

(f) neutral speed control means for shifting said clutch member from each of said operative positions thereof to an axially adjacent inoperative position;

(g) a reverse gear countershaft;

(h) reverse gearing means including a plurality of gear members respectively mounted on said input shaft, said output shaft, and said reverse gear countershaft;

(i) reverse speed control means for moving said gear members relative to each other toward and away from an engaged position in which said gear members are meshingly engaged to rotate said output shaft in said reverse direction when said input shaft rotates in said predetermined direction; and (j) motion transmitting means connecting said neutral speed control means to said reverse speed control means for moving said clutch member from said operative positions thereof to an inoperative position thereof when said gear members are moved toward said engaged position.

6. A transmission as set forth in claim 5, wherein said neutral speed control means and said reverse speed control means include respective movable shifting members, and said motion transmitting means include a lost motion linkage connecting said shifting members for delayed joint movement.

7. A transmission as set forth in claim 5, wherein said forward speed shifting means include a forward speed shifting member connected to said clutch member for joint movement, whereby respective positions of said forward speed shifting member correspond to the operative and inoperative positions of said clutch member; and said neutral speed control means include a neutral speed shifting member movable between three positions thereof, and cam means connected to said neutral speed shifting member for joint movement, said cam means engaging said forward speed shifting member for moving the same from a position thereof corresponding to an operative position of said clutch member to a position corresponding to an inoperative position of said clutch member when said neutral speed shifting member moves from a first to a second position thereof, and for locking said forward speed shifting member in the position corresponding to the inoperative position of said clutch member when said neutral speed shifting member moves from said second to said third position thereof.

8. A transmission as set forth in claim 7, wherein said reverse speed control means include a reverse speed shifting member connected to said gearing for joint movement, and said motion transmitting means include a lost motion linkage connecting said reverse speed shifting member to said neutral speed shifting member for selective movement of said reverse speed shifting member with said neutral speed shifting member when the latter moves from said second to said third position thereof.

9. A transmission as set forth in claim 7, wherein said reverse speed control means include a reverse speed shifting member connected to said gearing for joint movement, and said motion transmitting means include linkage means connecting said reverse speed shifting member to said neutral speed shifting member for selectively moving said gear members into said engaged position thereof when said neutral speed shifting member moves from said second to said third position thereof.

10. A transmission as set forth in claim 7, wherein said forward speed shifting member has a toothed ratchet portion, and said cam means include a dog member movable toward and away from said ratchet portion for camming engagement with the teeth thereof, and a cam member connected to said neutral speed shifting member for movement therewith, said cam member engaging said dog member for moving the same toward and away from said teeth when said neutral speed shifting member moves between said positions thereof.

References Cited by the Examiner

UNITED STATES PATENTS

| 1,241,414 | 9/17 | Masury et al. | 74—476 |
| 1,507,217 | 9/24 | Sweet et al. | 74—476 |
| 2,489,735 | 11/49 | Zancan | 74—476 |

DON A. WAITE, *Primary Examiner.*